Dec. 12, 1950  J. W. PICKING ET AL  2,534,207
VOLTAGE SPLITTING CIRCUIT
Filed Oct. 8, 1948

INVENTORS
JAY W. PICKING
WALTER J. BROWN
BY
Woodling and Krost
attys.

WITNESS:

Patented Dec. 12, 1950

2,534,207

UNITED STATES PATENT OFFICE 2,534,207

VOLTAGE SPLITTING CIRCUIT

Jay W. Picking, Cleveland, and Walter J. Brown, Cleveland Heights, Ohio

Application October 8, 1948, Serial No. 53,558

23 Claims. (Cl. 171—97)

The invention relates in general to voltage dividing or voltage splitting circuits and more particularly to voltage splitting circuits that split an input voltage at a definite value.

An object of the invention is to provide a voltage splitting circuit that will split an incoming variable signal voltage at a definite magnitude as opposed to voltage dividers that divide an incoming variable signal voltage at a definite proportion of the incoming voltage.

Another object of the invention is to provide a voltage splitting circuit for providing two output voltages, one of which varies directly for low values of input voltage, and the other of which varies inversely for higher values of input voltage.

Another object of the invention is to provide a voltage splitting circuit that will split an input voltage into first and second output voltages with the first output voltage varying directly with the input voltage below a reference value and remaining constant at this reference value for input voltages above the reference value, and the second output voltage remaining at the reference value for input voltages below the reference value and varying inversely with the input voltage for values thereof above the reference value.

Yet another object of the invention is to provide a circuit performing the functions as stated immediately above wherein the second output voltage varies inversely as a nonlinear function approaching a hyperbolic function of the input voltage for values thereof above the reference value.

A still further object of the invention is to provide a voltage splitting circuit that includes rectifier devices which will conduct current at a definite reference value and thus an output voltage may effect a transition at this definite value from a condition of varying in accordance with the input signal voltage to a condition of remaining substantially constant, and a second output voltage vice versa.

Other objects and a fuller understanding of the invention may be had by referring to the following description and claims, taken in conjunction with the accompanying drawings, in which:

Figure 1:
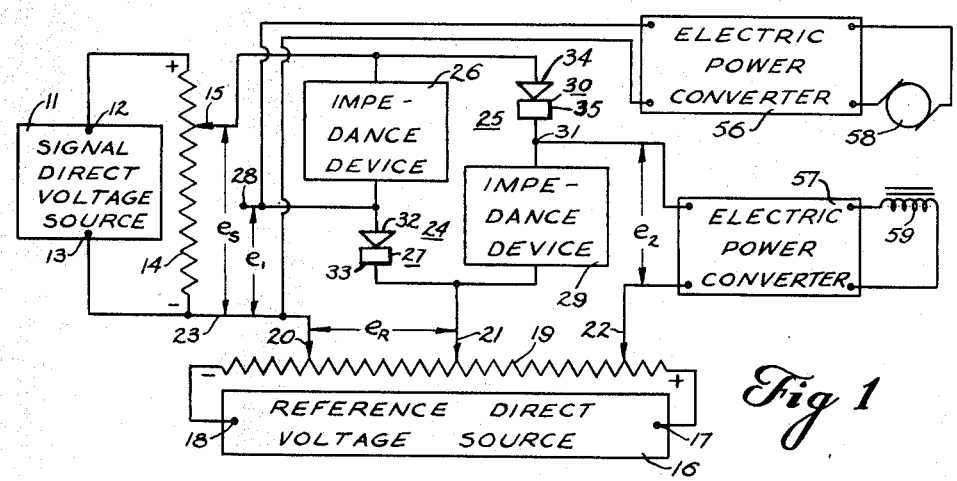
Figure 1 is an electrical circuit diagram of a basic circuit for accomplishing voltage splitting of an input signal voltage into two output voltages.

The basic circuit as in Figure 1 shows a source of signal direct voltage 11 having positive and negative terminals 12 and 13, respectively. The signal direct voltage source 11 has a variable output, and this variable output may be provided in any suitable manner. For purposes of illustration, this variation is provided by a potentiometer 14 having a variable tap 15 and being connected across the positive and negative terminals 12 and 13. A reference direct voltage source 16 is shown as having positive and negative terminals 17 and 18, respectively. Connected across this reference direct voltage source 16 is an impedance shown as a resistance 19 for obtaining reference voltages from this reference direct voltage source 16. First, second and third reference voltage terminals 20, 21 and 22, respectively, have been provided on the resistance 19, and these reference terminals have been shown as being variable taps on this resistance 19. A connection 23 interconnects the negative terminal 13 of the signal direct voltage source 11 and the first reference terminal 20 which is located at or near the negative terminal 18 of the reference direct voltage source 16. First and second branch paths 24 and 25, respectively, are paralleled between the variable tap 15 and the second reference terminal 21 of the resistance 19. The first branch path 24 includes an impedance device 26 and a rectifier device 27 with a first output terminal 28 connected therebetween. The second branch path 25 similarly includes an impedance device 29 and a rectifier device 30 with a second output terminal 31 connected therebetween. The first rectifier device 27 has an anode 32 and a cathode 33 for conducting electron current between the second reference terminal 21 and the variable tap 15. In a similar fashion, the second rectifier device 30 has an anode 34 and a cathode 35 for passing electron current between the second reference terminal 21 and the variable tap 15.

The operation of the circuit of Figure 1 is such as to obtain first and second output voltages which have a definite transition value as determined by a reference voltage value. A first output voltage $e_1$ is obtained between the first output terminal 28 and the first reference terminal 20 of the reference direct voltage source 16. A second output voltage $e_2$ is obtained between the second output terminal 31 and the third reference terminal 22 of the reference direct voltage source 16. A reference voltage $e_R$ is obtained from the reference direct voltage source 16 between the first and second reference terminals 20 and 21. The signal direct voltage source 11 is shown as being variable by means of the variable tap 15, to develop a signal voltage $e_s$ between the variable tap 15 and the negative terminal 13. To obtain the full usefulness from this circuit, the signal voltage $e_s$ from the signal direct voltage source should be capable of exceeding the value of the reference voltage obtained between the first and second reference terminals 20 and 21. When the rectifier device 27 is not passing any current, the impedance of this rectifier device 27 will be quite high, and will be quite high relative to the value of the impedance device 26. It may thus be seen that the potential of the first output terminal 28 will be essentially that of the potential of the variable tap 15. Since the first reference terminal 20 is connected to the negative terminal 13 of the signal direct voltage source 11, the first output voltage $e_1$ will vary directly and be substantially equal to the signal voltage $e_s$ obtained from the potentiometer 14 by the variable tap 15 for all values of the signal voltage $e_s$ below the value of the reference voltage $e_R$. When the variable tap 15 obtains a signal voltage $e_s$ from the potentiometer 14 that is of a value in excess of the value of the reference voltage $e_R$, then the rectifier device 27 will conduct current. When this rectifier device 27 is conducting current it will have a low value of impedance relative to the value of the impedance device 26, and hence the first output terminal 28 may be considered as being effectively tied to the second reference terminal 21, and will thus remain substantially at the potential of the second reference terminal 21. It will, therefore, be seen that for values of the signal voltage in excess of the reference voltage $e_R$ the first output voltage $e_1$ will remain substantially at a given value which is determined by the value of the reference voltage $e_R$ and, in this case, will equal the voltage $e_R$.

The second output voltage $e_2$ is obtained between the second output terminal 31 and the third reference terminal 22. When the signal voltage $e_s$ is less than the reference voltage $e_R$, the rectifier device 30 will not conduct and, hence, its impedance will be considerably greater than the value of the impedance device 29. Under these conditions, the second output terminal 31 will have a potential corresponding to the potential of the second reference terminal 21. The second output voltage $e_2$ will therefore be that of the voltage existing between the second and third reference terminals 21 and 22. When the signal voltage $e_s$ exceeds the reference voltage $e_R$, the rectifier device 30 will conduct current and, hence, the impedance thereof will be considerably lower than the impedance of the impedance device 29. For these conditions, the second output terminal 31 will be effectively tied to the variable tap 15 and the potential of the terminal 31 will vary in accordance with the potential of the variable tap 15. As the signal voltage $e_s$ increases above the value of the reference voltage $e_R$, the rectifier device 30 will pass increasing amounts of current to cause increasing values of voltage drop across the impedance device 29. This increasing voltage drop across the impedance device 29 will be in opposition to the voltage obtained from the resistance 19 between the second and third reference terminals 21 and 22 and hence the second output voltage will continue to decrease as the signal voltage $e_s$ increases. It may thus be seen that the second output voltage $e_2$ varies in accordance with the signal voltage $e_s$, which variation is an inverse variation.

The first output voltage $e_1$ is connected to a first electric power converter 56, and the second output voltage $e_2$ is connected to a second electric power converter 57. The first and second electric power converters 56 and 57 are adapted to utilize the respective output voltages in the control of a load of these converters. The first electric power converter 56 has been shown as being connected to a motor armature 58 which may be a direct current motor armature. The second electric power converter 57 has been shown as being connected to an inductance 59 having an iron core. The inductance 59 may be the field winding of the motor armature 58.

Figure 3:
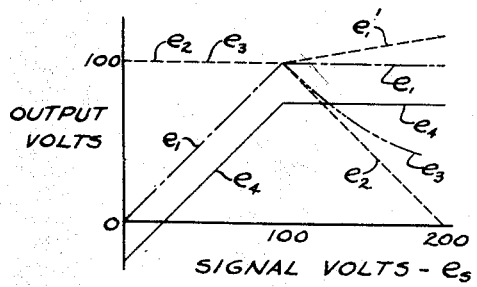
Figure 3 is a graph showing the voltages obtainable from the circuits of Figures 1 and 2.

The graph of Figure 3 may be referred to as an aid in understanding the variations in the first and second output voltages with variations of signal voltage $e_s$. For purposes of illustration, the value of the reference voltage $e_R$ between the first and second reference terminals 20 and 21 has been taken as 100 volts with a maximum value of signal voltage $e_s$ as being 200 volts. It will be seen from looking at the graph of Figure 3 that the first and second output voltages $e_1$ and $e_2$ have a definite transition value or a knee in the curve at a value of signal voltage equal to the value of the reference voltage $e_R$, which in this case has been taken as 100 volts. The first output voltage $e_1$ between the first output terminal 28 and the first reference terminal 20 varies directly as a substantially linear function of the signal voltage $e_s$ until the reference voltage value is reached. When the signal voltage $e_s$ equals the value of the reference voltage $e_R$, the rectifier 27 conducts and from there on the potential of the first output terminal 28 is held substantially at the potential of the second reference terminal 21. Therefore, the first output voltage $e_1$ remains substantially constant at a given value, in this case 100 volts, for all values of the signal voltage $e_s$ in excess of the value of the reference voltage $e_R$.

The second output voltage $e_2$ remains substantially constant at a given value for all values of the signal voltage $e_s$ below the value of the reference voltage $e_R$. The value of the second output voltage $e_2$ under these conditions is the value of the voltage between the second and third reference terminals 21 and 22. This may sometimes be referred to as a second reference voltage, and for purposes of illustration, this has also been shown as being equal to 100 volts. When the signal voltage $e_s$ exceeds the value of the reference voltage $e_R$, the rectifier 30 will conduct, and hence the current passing through this rectifier will cause a voltage drop across the impedance device 29 which causes the second output voltage $e_2$ to decrease.

Figure 2:
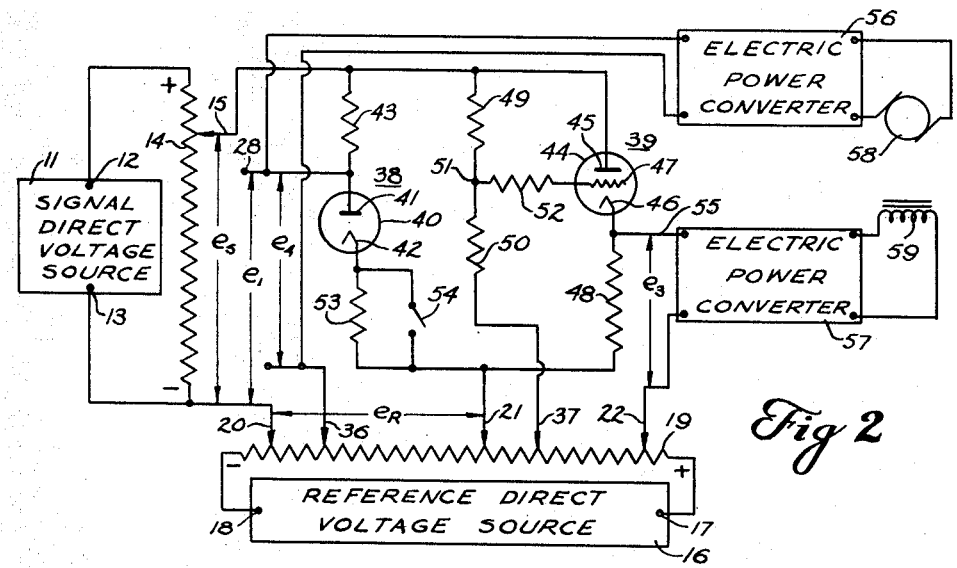
Figure 2 is a circuit diagram of the preferred embodiment of the invention incorporating certain improvements over the circuit of Figure 1.

The circuit of Figure 2 is an improvement over the circuit of Figure 1, but in general retains the same basic operation. The signal direct voltage source 11 again supplies a variable signal voltage $e_s$ between the variable tap 15 and the negative terminal 13 of the voltage source 11. The variable feature has been indicated as being obtained from the potentiometer 14 but it is obvious that this is by way of illustration only and any form of variable signal voltage may be used. The reference direct voltage source 16 has again been shown as having a resistance 19 connected across the positive and negative terminals 17 and 18 thereof. The first, second and third reference terminals 20, 21 and 22 have again been shown and additionally fourth and fifth reference terminals 36 and 37, respectively, have been shown as variable taps on this resistance 19. The circuit includes first and second branch paths 38 and 39 paralleled between the variable tap 15 and the second reference terminal 21. The first branch path 38 includes a thermionic tube 40 having an anode 41 and a cathode 42. The anode resistor 43 is connected in series with the anode 41 with the first output terminal 28 connected therebetween. A cathode impedance 53 and shunting switch 54 are connected between the cathode 42 and terminal 21.

The second branch path 39 includes a thermionic tube 44 having an anode 45, a cathode 46 and a control grid 47. A cathode resistor 48 is connected to the cathode 46 with a third output terminal 55 connected therebetween. First and second grid biasing impedances 49 and 50 are serially connected between the variable tap 15 and the fifth reference terminal 37. The control grid 47 is connected to the juncture 51 of the first and second grid biasing impedances 49 and 50 by a grid current limiting resistance 52.

The operation of the circuit of Figure 2 is basically the same as that of the operation of the circuit of Figure 1. The reference voltage $e_R$ is again obtained between the first and second reference terminals 20 and 21. When the value of the signal voltage $e_s$ exceeds the value of the reference voltage $e_R$ the thermionic tubes 40 and 44 will conduct current. A first output voltage $e_1$ is obtained between the first output terminal 28 and the first reference terminal 20, and a third output voltage $e_3$ is obtained between the third output terminal 55 and the third reference terminal 22. A fourth output voltage $e_4$ may be obtained between the first output terminal 28 and the fourth reference terminal 36. The fourth reference terminal 36 has been shown as having a potential that is positive relative to the potential of the first reference terminal 20. The fourth output voltage $e_4$ is shown as being connected to the first electric power converter 56 which supplies electric power to the motor armature 58 and the third output voltage $e_3$ is shown as being connected to the second electric power converter 57 for control of the energy supplied to the inductance 59.

The graph of Figure 3 may be referred to as an aid in understanding the operation of the circuit of Figure 2. The operation of the circuit shall first be described with the shunting switch 54 closed to remove the cathode impedance 53 from the circuit. For values of signal voltage $e_s$ below the value of the reference voltage $e_R$, the first and fourth output voltages $e_1$ and $e_4$ will vary directly as a substantially linear function of the signal voltage $e_s$. The reference voltage $e_R$ determines the transition value at which the output voltages have a knee in the curve. The graph of the first output voltage $e_1$ is the same for the Figure 2 as for the Figure 1. Since the fourth output voltage $e_4$ is obtained between the first output terminal 28 and the fourth reference terminal 36, the fourth output voltage $e_4$ will have the curve thereof displaced from the curve of the first output voltage $e_1$ by the potential difference between the first and fourth reference terminals 20 and 36.

The third output voltage $e_3$ will be the same as the second output voltage $e_2$ obtained from the circuit of Figure 1 for values of the signal voltage $e_s$ less than the value of the reference voltage $e_R$. Since the second branch path 39 has included therein a thermionic tube which includes a control grid 47, the third output voltage $e_3$ will not coincide with the second output voltage $e_2$ obtained from the circuit of Figure 1 when the signal voltage $e_s$ exceeds the reference voltage $e_R$. The thermionic tube 44 is shown as a triode but may be other forms of thermionic tubes having control grids. The purpose of using a triode for the thermionic tube 44 is to obtain a non-linear characteristic of the third output voltage $e_3$ when the signal voltage $e_s$ exceeds the reference voltage $e_R$.

An application of this voltage splitting circuit is in the control of a generator excited direct current motor control system wherein it is desired to control the fields of both the direct current generator and direct current motor. Another application is to control separate electric converters supplying power to the armature and field, respectively, of a direct current motor. In either of the above cases, the control would be of the armature and field energization of a direct current motor. In the circuit of Figure 2, the inductance 59 may be the field winding of the motor armature 58 and, hence, the circuit of Figure 2 which incorporates the control grid tube 44 may have special application. As is well known, the speed of the direct current motor may be governed by the voltage applied to the motor armature and may further be governed by the field excitation of the direct current motor. In customary speed control of the direct current motor in such a system, it is usual to vary the generator field excitation, or the output of the electric converter supplying the armature, from zero to a given value to obtain any speed of the direct current motor between zero and base speed. For speeds of the motor above base speed, the field of the motor is weakened from its normal excitation. The first and second output voltages $e_1$ and $e_2$ of the circuit of Figure 1 will provide the requisite control for the generator field or armature converter and for the motor field, respectively. The circuit of Figure 2 provides an improvement over the circuit of Figure 1 since it provides a nonlinear variation characteristic in the third output voltage. This third output voltage $e_3$ would be that used to control the motor field. Since the speed of a direct current motor varies as a function of a constant divided by the field flux, it will be seen that variation of motor speed with field flux is a hyperbolic function. The field flux varies with the field voltage over a part of the working range as a linear function though it departs thereafter from linearity, because of field saturation. Accordingly, the field voltage and motor speed vary directly as a non-linear function approaching a hyperbolic function. Consequently, since the second output voltage of Figure 1 varies linearly with the signal input voltage, the motor speed would vary in a manner approaching a hyperbolic function of the signal input voltage for motor speed above base speed. This condition is undesirable because given increments of signal voltage cause increasingly larger changes of motor speed as the motor speed increases above base speed. To at least partially compensate for this roughly hyperbolic characteristic of motor speed versus field current, the circuit of Figure 2 uses a control grid tube 44 which has a nonlinear grid voltage-plate current characteristic. This nonlinear curve, when combined with the roughly hyperbolic curve of motor speed-field voltage will result in a motor speed-signal voltage curve that is more nearly linear. The control grid 47 is biased positively relative to the cathode 46 for signal voltages at and slightly above transfer or the transition point, and, hence, the tube 44 will conduct a maximum current when the signal voltage $e_s$ exceeds the reference voltage $e_R$. However, as the signal voltage $e_s$ increases, the increase in the current passed by the tube 44 will cause increasing voltage drops across the cathode resistor 48. This will cause a self-biasing action which will bias the grid 47 negatively relative to the cathode 46 thus increasing the impedance of the thermionic tube 44. The third output terminal 55 will thus not be exactly tied to the potential of the variable tap 15 but will differ in potential by the voltage drop across the tube 44. This causes the nonlinear characteristic of the third output voltage $e_3$ when the signal voltage $e_s$ exceeds the reference voltage $e_R$.

In the branch circuit 38, when the switch 54 is opened, the cathode impedance 53 will be inserted in the circuit between the cathode 42 and the second reference terminal 21. Such a cathode impedance would cause a voltage drop to exist thereacross when the tube 40 is conducting current and thus the curve of the voltage $e_1$ would have a rising characteristic as shown by the curve $e_1'$ when the signal voltage $e_s$ exceeds the reference voltage $e_R$. This may be desirable in some cases where a rising characteristic of the first output voltage is beneficial.

The circuits of Figures 1 and 2 have been shown as having the negative terminals of the reference and signal voltage sources interconnected. By inverting the entire circuit, it will be seen that the positive terminals of these signal and reference voltage sources may be interconnected. To achieve such an inverted circuit, the rectifiers in the branch paths 24 and 25 or 38 and 39 should be inverted so that the anodes of the rectifiers will be connected toward the second reference terminal 21. The rectifier devices will thus begin to conduct current when the second reference terminal 21 is less negative than the voltage at the variable tap 15. An output voltage similar to the first or fourth output voltage which will vary directly with the signal voltage variations for values less than the first reference voltage value and which will stay substantially constant at a given value for voltages greater than the first reference voltage value may then be obtained between the interconnected positive terminals and the output terminal which is at the point of interconnection between the rectifier cathode and the impedance device in the appropriate branch circuit. Also, an output voltage similar to the second or third output voltage which remains substantially constant at a given voltage value for signal voltage values less than the first reference voltage and thereafter varies inversely with the signal voltage values for values thereof greater than the value of the first reference voltage may be obtained between a negative terminal of the reference direct voltage source and the output terminal in the other branch path which is at the point of interconnection between the rectifier anode and the impedance device. Thus, this inverted circuit would give voltages having the same characteristics as the circuits of Figures 1 and 2.

The taps 20, 21, 22, 36 and 37 on the resistance 19 have been shown as being variable to depict that variations in the potentials obtainable therefrom are within the contemplation of the invention. By varying the tap 20, the first output voltage $e_1$ and the reference voltage $e_R$, will vary. Variation of the tap 21 will change all of the voltages except the signal voltage $e_s$. Variation of the tap 37 will vary the point at which the grid 47 becomes negative relative to cathode 46, and hence will alter the curve of the third output voltage $e_3$. Variations in 22 and 36 taps will effect variations in the third and fourth output voltages $e_3$ and $e_4$.

Although the invention has been described in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

We claim:

1. A voltage splitter comprising, a variable input source of a direct voltage having first and second terminals, a source of reference direct voltage having first and second terminals, the voltage between said first and second reference voltage terminals being in the same sense as the voltage between said first and second input voltage terminals, means to interconnect said first terminals, first and second paralleled branch paths interconnecting said second terminals, said branch paths each including a rectifier device and an impedance with the rectifier devices being reversely connected relative to the impedances, first and second output terminals connected to said first and second branch paths, respectively, wherein a first output voltage is developed between said first output terminal and a terminal connected to said reference voltage source, and a second output voltage is developed between said second output terminal and a terminal connected to said reference voltage source.

2. A voltage splitter comprising, a variable input source of a direct voltage having first and second terminals, a source of reference direct voltage having first and second terminals, the voltage between said first and second reference voltage terminals being in the same sense as the voltage between said first and second input voltage terminals, means to interconnect said first terminals, first and second paralleled branch paths interconnecting said second terminals, said branch paths each including an impedance and a rectifier device with the anode of one of the rectifier devices being connected to one of the impedances and the cathode of the other rectifier device being connected to the other of the impedances, first and second output terminals connected to said first and second branch paths, respectively, wherein a first output voltage is developed between said first output terminal and a terminal connected to said reference voltage source, and a second output voltage is developed between said second output terminal and a terminal connected to said reference voltage source.

3. A voltage splitter comprising, a variable input source of a direct voltage having first and second terminals, a source of reference direct voltage having first and second terminals, the voltage between said first and second reference voltage terminals being in the same sense as the voltage between said first and second input voltage terminals, means to interconnect said first terminals, first and second paralleled branch paths interconnecting said second terminals, said branch paths each including an impedance and a rectifier device with the impedances in the two branch paths being connected to opposite elements of the rectifier devices, first and second output terminals connected to said first and second branch paths, respectively, wherein a first output voltage is developed between said first output terminal and a terminal connected to said reference voltage source which terminal is negative relative to said second reference voltage terminal, and a second output voltage is developed between said second output terminal and a terminal connected to said reference voltage source which terminal is positive relative to said second reference voltage terminal.

4. A voltage splitter, comprising a variable source of input direct voltage having negative and positive terminals, a source of reference direct voltage having a first terminal and a second terminal positive relative to said first terminal for defining a reference voltage, means to interconnect a terminal of each of said sources, first and second paralleled branch paths interconnecting said positive and said second terminals, said branch paths each including an impedance and a rectifier device, one of said rectifier devices having a control element, first and second output terminals connected to said first and second branch paths, respectively, at the juncture of the impedance and the rectifier device with the rectifier devices reversely connected relative to the associated impedances, and means to apply to said control element a voltage representative of the input voltage wherein a first output voltage is developed between said first output terminal and a terminal connected to said reference voltage source, and a second output voltage is developed between said second output terminal and a terminal connected to said reference voltage source which voltage approaches asymptotically a predetermined value as the input voltage approaches one end of its range of variations.

5. A signal voltage splitter, comprising a variable source of signal direct voltage having negative and positive terminals, a source of reference direct voltage having a first terminal and a second terminal positive relative to said first terminal for defining a reference voltage, means to interconnect a terminal of each of said sources, first and second paralleled branch paths interconnecting said positive and said second terminals, said branch paths each including an impedance and a rectifier device with the rectifier devices being reversely connected relative to said impedances, one of said rectifier devices being nonlinear, first and second output terminals connected to said first and second branch paths, respectively, wherein a first output voltage is developed between said first output terminal and a terminal connected to said reference voltage source, and a second output voltage is developed between said second output terminal and a terminal connected to said reference voltage source, whereby said first output voltage varies in accordance with signal voltage variations for signal voltage variations less than said reference voltage value and whereby said second output voltage varies as a nonlinear function in accordance with signal voltage variations for signal voltage values greater than said reference voltage value.

6. A signal voltage splitter, comprising a variable source of signal direct voltage having negative and positive terminals, a source of reference direct voltage having a first terminal and a second terminal positive relative to said first terminal for defining a reference voltage, means to interconnect said negative and said first terminals, first and second paralleled branch paths interconnecting said positive and said second terminals, said branch paths each including an impedance in series with a rectifier device with the anode thereof being connected toward said positive signal voltage terminal, first and second output terminals connected to said first and second branch paths, respectively, said first output terminal being connected at the juncture of the impedance and the rectifier anode in the first branch path, and said second output terminal being connected at the juncture of the impedance and the rectifier cathode in the second branch path, wherein a first output voltage is developed between said first output terminal and a terminal connected to said reference voltage source, and a second output voltage is developed between said second output terminal and a terminal connected to said reference voltage source, whereby said first output voltage varies in accordance with signal voltage variations for signal voltage variations less than said reference voltage value and whereby said second output voltage varies in accordance with signal voltage variations for signal voltage values greater than said reference voltage value.

7. A signal voltage splitter, comprising a variable source of signal direct voltage having negative and positive terminals, a source of reference direct voltage having a first terminal and a second terminal positive relative to said first terminal for defining a reference voltage, means to interconnect a terminal of each of said sources, first and second paralleled branch paths interconnecting said positive and said second terminals, said branch paths each including an impedance and a rectifier device with the rectifier devices being oppositely connected relative to the associated impedances, first and second output terminals connected to said first and second branch paths, respectively, wherein a first output voltage is developed between said first output terminal and a terminal connected to said reference voltage source, and a second output voltage is developed between said second output terminal and a terminal connected to said reference voltage source, whereby said first output voltage varies in accordance with signal voltage variations for signal voltage variations less than said reference voltage value and then remains substantially constant at a given value for signal voltage variations greater than said reference voltage value, and whereby said second output voltage remains substantially constant at a given value for signal voltage variations less than said reference voltage value and varies in proportion to signal voltage variations for signal voltage values greater than said reference voltage value.

8. A signal voltage splitter, comprising a variable source of signal direct voltage having negative and positive terminals, a source of reference direct voltage having negative, intermediate and positive terminals, first and second branch paths paralleled across said positive signal voltage terminal and said intermediate reference voltage terminal, additional connection means to interconnect said sources, said branch paths each including a rectifier device and an impedance device serially connected with first and second output terminals connected therebetween, respectively, said negative and positive reference voltage terminals constituting third and fourth output terminals, respectively, said negative and intermediate reference voltage terminals having a first reference voltage developed thereacross at a value less than the maximum value of said signal voltage, said intermediate and positive reference voltage terminals having a second reference voltage developed thereacross at a value less than the maximum value of said signal voltage, said rectifier devices being thermionic tubes having an anode and a cathode, said impedance device in said first branch circuit being connected to said anode of the thermionic tube therein, and said impedance device in said second branch circuit being connected to said cathode of the thermionic tube therein, whereby a first output voltage is developed across said first and third output terminals and a second output voltage is developed across said second and fourth output terminals.

9. A signal voltage splitter, comprising a variable source of signal direct voltage having negative and positive terminals, a source of reference direct voltage having negative, intermediate and positive terminals, first and second branch paths paralleled across said positive signal voltage terminal and said intermediate reference voltage terminal, means to interconnect two terminals of said sources, said branch paths each including a rectifier device and an impedance device serially connected with first and second output terminals connected therebetween, respectively, said rectifier devices being connected in the same sense, said negative and positive reference voltage terminals constituting third and fourth output terminals, respectively, said negative and intermediate reference voltage terminals having a first reference voltage developed thereacross at a value less than the maximum value of said signal voltage, said intermediate and positive reference voltage terminals having a second reference voltage developed thereacross, said rectifier devices being thermionic tubes having an anode and a cathode, said impedance device in said first branch circuit being connected to said anode of the thermionic tube therein, and said impedance device in said second branch circuit being connected to said cathode of the thermionic tube therein, whereby a first output voltage is developed across said first and third output terminals which varies directly with the variations in said signal voltage up to the value of the first reference voltage, and whereby a second output voltage is developed across said second and fourth output terminals which remains substantially constant at a value equal to the second reference voltage for values of said signal voltage less than said first reference voltage value.

10. A signal voltage splitter, comprising a variable source of signal direct voltage having negative and positive terminals, a source of reference direct voltage having negative, intermediate and positive terminals, first and second branch paths paralleled across said positive signal voltage terminal and said intermediate reference voltage terminal, means to interconnect two terminals of said sources, said branch paths each including a rectifier device and an impedance device serially connected with first and second output terminals connected therebetween, respectively, said rectifier devices being connected in the same sense, said negative and positive reference voltage terminals constituting third and fourth output terminals, respectively, said negative and intermediate reference voltage terminals having a first reference voltage developed thereacross which is less than the maximum value of said signal voltage, said intermediate and positive reference voltage terminals having a second reference voltage developed thereacross, said rectifier devices being thermionic tubes having an anode and a cathode, said impedance device in said first branch circuit being connected to said anode of the thermionic tube therein, and said impedance device in said second branch circuit being connected to said cathode of the thermionic tube therein, one of said rectifier devices being a thermionic tube having a control grid, first and second grid biasing impedances serially connected between said positive signal voltage terminal and said reference voltage source, and means for connecting said grid to the juncture of said first and second grid biasing impedances, whereby a first output voltage is developed across said first and third output terminals which varies in direct proportion as a substantially linear function of the variations in said signal voltage up to the value of the first reference voltage and stays substantially constant at a value equal to said first reference voltage for signal voltage variations greater than said first reference voltage value, and whereby a second output voltage is developed across said second and fourth output terminals which remains substantially constant at a value equal to the second reference voltage for values of said signal voltage less than said first reference voltage value and varies in inverse proportion as a nonlinear function of the signal voltage for values of said signal voltage greater than said first reference voltage value.

11. A signal voltage splitter, comprising a variable source of signal direct voltage having negative and positive terminals, a source of reference direct voltage having negative, intermediate and positive terminals, first and second branch paths paralleled across said positive signal voltage terminal and said intermediate reference voltage terminal, means for interconnecting said sources, said branch paths each including a rectifier device and an impedance device serially connected with first and second output terminals connected therebetween, respectively, said negative and positive reference voltage terminals constituting third and fourth output terminals, respectively, said negative and intermediate reference voltage terminals having a first reference voltage developed thereacross, said intermediate and positive reference voltage terminals having a second reference voltage developed thereacross, whereby a first output voltage is developed across said first and third output terminals which varies directly with the variations in said signal voltage up to the value of the first reference voltage, and whereby a second output voltage is developed across said second and fourth output terminals which remains substantially constant at a value equal to the second reference voltage for values of said signal voltage less than said first reference voltage value.

12. A signal voltage splitter, comprising a variable source of signal direct voltage having negative and positive terminals, a source of reference direct voltage having negative, intermediate and positive terminals, first and second branch paths paralleled across said positive signal voltage terminal and said intermediate reference voltage terminal, means to interconnect said sources, said branch paths each including a rectifier device and an impedance device serially connected with first and second output terminals connected therebetween, respectively, said negative and positive reference voltage terminals constituting third and fourth output terminals, respectively, said negative and intermediate reference voltage terminals having a first reference voltage developed thereacross, said intermediate and positive reference voltage terminals having a second reference voltage developed thereacross, whereby a first output voltage is developed across said first and third output terminals which varies directly with the variations in said signal voltage up to the value of the first reference voltage and stays substantially constant at a value equal to said first reference voltage for signal voltage variations greater than said first reference voltage value, and whereby a second output voltage is developed across said second and fourth output terminals which remains substantially constant at a value equal to the second reference voltage for values of said signal voltage less than said first reference voltage value and varies inversely with the signal voltage for values of said signal voltage greater than said first reference voltage value.

13. A signal voltage splitter, comprising a variable source of signal direct voltage having negative and positive terminals, a source of reference direct voltage having negative, intermediate and positive terminals, first and second branch paths paralleled across said positive signal voltage terminal and said intermediate reference voltage terminal, means to interconnect said sources, said branch paths each including a rectifier device and an impedance device serially connected with first and second output terminals connected therebetween, respectively, said negative and positive reference voltage terminals constituting third and fourth output terminals, respectively, said negative and intermediate reference voltage terminals having a first reference voltage developed thereacross, said intermediate and positive reference voltage terminals having a second reference voltage developed thereacross, whereby a first output voltage is developed across said first and third output terminals which varies in direct proportion as a substantially linear function of the variations in said signal voltage up to the value of the first reference voltage and stays substantially constant at a value equal to said first reference voltage for signal voltage variations greater than said first reference voltage value, and whereby a second output voltage is developed across said second and fourth output terminals which remains substantially constant at a value equal to the second reference voltage for values of said signal voltage less than said first reference voltage value and varies in inverse proportion as a substantially linear function of the signal voltage for values of said signal voltage greater than said first reference voltage value.

14. A signal voltage splitter, comprising a variable source of signal direct voltage having negative and positive terminals, a source of reference direct voltage having negative, intermediate and positive terminals, first and second branch paths parallelled across said positive signal voltage terminal and said intermediate reference voltage terminal, means for interconnecting said sources, said branch paths each including a rectifier device and an impedance device serially connected with first and second output terminals connected therebetween, respectively, said negative and positive reference voltage terminals constituting third and fourth output terminals, respectively, said negative and intermediate reference voltage terminals having a first reference voltage developed thereacross, said intermediate and positive reference voltage terminals having a second reference voltage developed thereacross, one of said rectifier devices being a thermionic tube having a control grid, first and second grid biasing impedances serially connected between said positive signal voltage terminal and said reference voltage source, and means for connecting said grid to the juncture of said first and second grid biasing impedances, whereby a first output voltage is developed across said first and third output terminals which varies in direct proportion as a substantially linear function of the variations in said signal voltage up to the value of the first reference voltage and stays substantially constant at a value equal to said first reference voltage for signal voltage variations greater than said first reference voltage value, and whereby a second output voltage is developed across said second and fourth output terminals which remains substantially constant at a value equal to the second reference voltage for values of said signal voltage less than said first reference voltage value and varies in inverse proportion as a nonlinear function of the signal voltage having a continuously decreasing rate of change for values of said signal voltage greater than said first reference voltage value.

15. A voltage dividing circuit including a signal direct voltage source, a reference direct voltage source, a first rectifier having a first cathode and a first anode, a second rectifier having a second cathode and a second anode, a cathode resistor interconnecting said cathodes, an anode resistor interconnecting said anodes, means to apply a variable signal potential to said first anode from said signal direct voltage source, means to apply a reference potential to said second cathode from an intermediate terminal of said reference direct voltage source, connection means for interconnecting the negative terminals of said sources, a first terminal at said negative source terminals, a second terminal at the juncture of said second anode and said anode resistor, a third terminal at the juncture of said first cathode and said cathode resistor, and a fourth terminal at the positive end of said reference direct voltage source, said negative and intermediate reference voltage terminals establishing a first reference voltage and said intermediate and positive reference voltage terminals establishing a second reference voltage, whereby the voltage across the first and second terminals varies in accordance with the signal voltage variations for signal voltage values less than the value of the first reference voltage, and whereby the voltage across the third and fourth terminals remains substantially at the value of the second reference voltage for signal voltage variations less than the value of said first reference voltage.

16. A voltage dividing circuit including a signal direct voltage source, a reference direct voltage source, a first rectifier having a first cathode and a first anode, a second rectifier having a second cathode and a second anode, a cathode resistor interconnecting said cathodes, an anode resistor interconnecting said anodes, means to apply a variable signal potential to said first anode from said signal direct voltage source, means to apply a reference potential to said second cathode from an intermediate terminal of said reference direct voltage source, connection means for interconnecting the negative terminals of said sources, a first terminal at said negative source terminals, a second terminal at the juncture of said second anode and said anode resistor, a third terminal at the juncture of said first cathode and said cathode resistor, and a fourth terminal at the positive end of said reference direct voltage source, whereby a first output voltage is obtained at the first and second terminals and a second output voltage is obtained at the third and fourth terminals.

17. A voltage dividing circuit including a signal direct voltage source, a reference direct voltage source, a first rectifier having a first cathode and a first anode, a second rectifier having a second cathode and a second anode, a cathode resistor interconnecting said cathodes, an anode resistor interconnecting said anodes, means to apply a variable signal potential to said first anode from said signal direct voltage source, means to apply a reference potential to said second cathode from an intermediate terminal of said reference direct voltage source, connection means for interconnecting the negative terminals of said sources, a first terminal at said negative source terminals, a second terminal at the juncture of said second anode and said anode resistor, a third terminal at the juncture of said first cathode and said cathode resistor, and a fourth terminal at the positive end of said reference direct voltage source, said negative and intermediate reference voltage terminals establishing a first reference voltage and said intermediate and positive reference voltage terminals establishing a second reference voltage, whereby the voltage across the first and second terminals varies directly as a substantially linear function of the signal voltage variations for signal voltage values less than the value of the first reference voltage and remains substantially constant at the value of the first reference voltage for variations of the signal voltage greater than the value of the first reference voltage, and whereby the voltage across the third and fourth terminals remains substantially at the value of the second reference voltage for signal voltage variations less than the value of said first reference voltage and varies inversely as a substantially linear function of the signal voltage variations greater than the value of the first reference voltage.

18. A voltage dividing circuit including a signal direct voltage source, a reference direct voltage source, a first rectifier having a first cathode and a first anode, a second rectifier having a second cathode and a second anode, a cathode resistor interconnecting said cathodes, an anode resistor interconnecting said anodes, means to apply a variable signal potential to said first anode from said signal direct voltage source, means to apply a reference potential to said second cathode from an intermediate terminal of said reference direct voltage source, connection means for interconnecting the negative terminals of said sources, a first terminal at said negative source terminals, a second terminal at the juncture of said second anode and said anode resistor, a third terminal at the juncture of said first cathode and said cathode resistor, and a fourth terminal at the positive end of said reference direct voltage source, said first rectifier being a thermionic tube having a control grid, first and second grid biasing impedances serially connected between said first anode and a connection to said reference voltage source having a potential more positive than said intermediate terminal, and means for connecting said grid to the juncture of said first and second grid biasing impedances, said negative and intermediate reference voltage terminals establishing a first reference voltage and said intermediate and positive reference voltage terminals establishing a second reference voltage, whereby the voltage across the first and second terminals varies directly as a substantially linear function of the signal voltage variations for signal voltage values less than the value of the first reference voltage and remains substantially constant at the value of the first reference voltage for variations of the signal voltage greater than the value of the first reference voltage, and whereby the voltage across the third and fourth terminals remains substantially at the value of the second reference voltage for signal voltage variations less than the value of said first reference voltage and varies inversely as a nonlinear function approaching a hyperbolic function of the signal voltage variations over at least a part of the range of signal voltage variations greater than the value of the first reference voltage.

19. A voltage splitting circuit for deriving from a variable input voltage two unidirectional output voltages which may vary in different ways in dependence on variations in the input voltage, said circuit comprising means for establishing a unidirectional reference potential, means for establishing a difference voltage comprising the difference between a potential obtained from the input voltage and said unidirectional reference potential, first and second parallel connected branch circuits, means for connecting said difference voltage across said paralleled branch circuits, said branch circuits each comprising a rectifier device and an impedance serially connected with first and second output terminals therebetween, respectively, one of said impedances being connected to the anode end of the associated rectifier device and the other of said impedances being connected to the cathode end of the associated rectifier device, one of said output voltages being obtained between said first output terminal and a terminal having a definable potential relative to said reference potential and the other output voltage being obtained between said second output terminal and a terminal having a definable potential relative to said reference potential.

20. A voltage splitting circuit operable from a variable input voltage comprising means for establishing a unidirectional reference potential, first and second parallel connected branch circuits, means for connecting across said paralleled branch circuits a voltage representing the difference in potential between said unidirectional reference potential and a potential obtained from said input voltage, said branch circuits each comprising a rectifier device and an impedance serially connected with first and second output terminals therebetween, respectively, one of said impedances being connected to the anode end of the associated rectifier device and the other of said impedances being connected to the cathode end of the associated rectifier device, one of said output voltages being obtained between said first output terminal and a terminal having a definable potential relative to said reference potential and the other output voltage being obtained between said second output terminal and a terminal having a definable potential relative to said reference potential.

21. A voltage splitting circuit operable from a variable input voltage comprising means for establishing a unidirectional reference potential, first and second parallel connected branch circuits, and means for connecting across said paralleled branch circuits a voltage representing the difference in potential between said unidirectional reference potential and a potential obtained from said input voltage, said branch circuits each comprising a rectifier device and an impedance serially connected with first and second output terminals therebetween, respectively, one of said rectifier devices having a control element, one of said impedances being connected to the anode end of the associated rectifier device and the other of said impedances being connected to the cathode end of the associated rectifier device, one of said output voltages being obtained between said first output terminal and a terminal having a definable potential relative to said reference potential and the other output voltage being obtained between said second output terminal and a terminal having a definable potential relative to said reference potential.

22. A voltage splitting circuit for deriving from a variable unidirectional input voltage two unidirectional output voltages which may vary in different ways in dependence on variations in the input voltage, said circuit comprising means for establishing a unidirectional reference voltage, means for connecting said input and reference voltages in opposition to establish a difference voltage, first and second parallel connected branch circuits, and means for connecting said difference voltage across said paralleled branch circuits, said branch circuits each comprising a rectifier device and an impedance serially connected with an output terminal at the juncture thereof, one of said impedances being connected to the anode end of the associated rectifier device and the other of said impedances being connected to the cathode end of the associated rectifier device, one of said output voltages being obtained from the output terminal in one branch circuit and a terminal connected to the reference voltage source and the other output voltage being obtained from the output terminal in the other branch circuit and a terminal connected to the reference voltage source.

23. A voltage splitting circuit for deriving from a variable unidirectional input voltage two unidirectional output voltages which may vary in different ways in dependence on variations in the input voltage, said circuit comprising means for establishing a unidirectional reference voltage, means for connecting said input and reference voltages in opposition to establish a difference voltage, first and second parallel connected branch circuits, and means for connecting said difference voltage across said paralleled branch circuits, said branch circuits each comprising a rectifier device and an impedance serially connected with an output terminal at the juncture thereof, one of said impedances being connected to the anode end of the associated rectifier device and the other of said impedances being connected to the cathode end of the associated rectifier device, one of said output voltages being obtained from the output terminal in one branch circuit and a first terminal connected to the reference voltage source and the other output voltage being obtained from the output terminal in the other branch circuit and a second terminal connected to the reference voltage source, the connections of the branch circuits to the reference voltage source being at a potential intermediate the potentials of said first and second terminals.

JAY W. PICKING.
WALTER J. BROWN.

REFERENCES CITED

The following references are of record in the file of this patent:

UNITED STATES PATENTS

| Number | Name | Date |
| --- | --- | --- |
| 2,337,932 | Rogers | Dec. 28, 1943 |